(12) United States Patent
Han et al.

(10) Patent No.: US 11,604,176 B2
(45) Date of Patent: Mar. 14, 2023

(54) METHOD FOR DETECTING ALDEHYDE AND KETONE BY USING THIN LAYER CHROMATOGRAPHY

(71) Applicant: LG Chem, Ltd., Seoul (KR)

(72) Inventors: Su Youn Han, Daejeon (KR); Byoung Hyoun Kim, Daejeon (KR); Byung Hyun Park, Daejeon (KR); Gyeongjin Lee, Daejeon (KR)

(73) Assignee: LG Chem, Ltd.

( * ) Notice: Subject to any disclaimer, the term of this patent is extended or adjusted under 35 U.S.C. 154(b) by 354 days.

(21) Appl. No.: 16/761,094

(22) PCT Filed: Jan. 22, 2019

(86) PCT No.: PCT/KR2019/000890
§ 371 (c)(1),
(2) Date: May 1, 2020

(87) PCT Pub. No.: WO2019/240349
PCT Pub. Date: Dec. 19, 2019

(65) Prior Publication Data
US 2020/0355656 A1   Nov. 12, 2020

(30) Foreign Application Priority Data
Jun. 11, 2018   (KR) .................. 10-2018-0066797

(51) Int. Cl.
*G01N 30/91*   (2006.01)
*G01N 30/94*   (2006.01)

(52) U.S. Cl.
CPC ............ *G01N 30/91* (2013.01); *G01N 30/94* (2013.01)

(58) Field of Classification Search
None
See application file for complete search history.

(56) References Cited

U.S. PATENT DOCUMENTS

| | | | |
|---|---|---|---|
| 6,060,601 | A | 5/2000 | Langhals et al. |
| 2008/0293151 | A1 | 11/2008 | Wada |
| 2013/0067996 | A1 | 3/2013 | Minoda et al. |
| 2014/0147926 | A1 | 5/2014 | Jeon et al. |

FOREIGN PATENT DOCUMENTS

| | | | |
|---|---|---|---|
| CN | 102466663 A | | 5/2012 |
| CN | 103026224 | * | 4/2013 |
| CN | 103197025 A | | 7/2013 |

(Continued)

OTHER PUBLICATIONS

Carunchio et al., Thin-Layer Chromatography of the MBTH Derivatives of Some Aliphatic Aldehydes, Talanta, pp. 47-48, Jan. 1985, vol. 32, No. 1, XP026566483.

(Continued)

*Primary Examiner* — Daniel S Larkin
(74) *Attorney, Agent, or Firm* — Lerner, David, Littenberg, Krumholz & Mentlik, LLP

(57) ABSTRACT

The present invention relates to a method for simultaneously qualitatively and quantitatively analyzing compounds of aldehydes and/or ketones in a short time by using an optimal TLC plate, a proportion of a developing solvent, a sample amount, etc., and can provide an analysis result equivalent to a conventional analysis result in a shorter time by providing the most optimal conditions when using the TLC method.

4 Claims, 4 Drawing Sheets

(56) References Cited

FOREIGN PATENT DOCUMENTS

| | | | |
|---|---|---|---|
| CN | 104076108 A | 10/2014 | |
| JP | H08233797 A | 9/1996 | |
| JP | H11124382 A | 5/1999 | |
| JP | 2001165921 A | 6/2001 | |
| JP | 2006314955 A | 11/2006 | |
| JP | 2007136294 A | 6/2007 | |
| JP | 2009168623 A | 7/2009 | |
| JP | 201008311 A | 1/2010 | |
| JP | 2010151607 A | 7/2010 | |
| JP | 2011093813 A | 5/2011 | |
| JP | 2017032403 A | 2/2017 | |
| KR | 20140066513 A | 6/2014 | |
| KR | 101463459 B1 | 11/2014 | |
| WO | 2011149041 A1 | 12/2011 | |

OTHER PUBLICATIONS

Extended European Search Report including Written Opinion for Application No. EP19819515.8, dated Nov. 3, 2020, pp. 1-9.

Fung et al., Measurement of Formaldehyde and Acetaldehyde Using 2, 4-Dinitrophenylhydrazine-impregnated Cartridges During the Carbonaceous Species Methods Comparison Study, Aerosol Science and Technology, Jan. 1990, pp. 44-48, vol. 12, Elsevier Science Publishing Co., Inc., XP008048877.

Tyihák et al., Behavior of the Dinitrophenvyihydrazones of Saturated Aldehydes and Ketones in Normal and Reversed Phase TLC and OPLC, Journal of Planar Chromatography, pp. 376-382, Sep./Oct. 1992, vol. 5, XP009523580.

Beyer et al., "Separation of 2,4-dinitrophenylhydrazones into classes by thin-layer chromatography on zinc carbonate", Journal of Chromatography, Feb. 1972, vol. 65, Issue 2, pp. 435-438.

Black et al., "The Use of 2,4-Dinitrophenylhydrazine Derivatives of Ovarian Ketosteroids in Steroid Analysis", Proceedings of the Iowa Academy of Science, Sep. 1978, vol. 85, No. 3, pp. 99-102.

Gerasimov et al, "Determination of Vanillin and Ethylvanillin in Vanilla Flavorings by Planar (Thin-Layer) Chromatography", Journal of Analytical Chemistry, Jul. 2003, vol. 58, pp. 677-684. Abstract Included Only.

Horak et al., "Microscale Group Test for Carbonyl Compounds", Journal of Chemical Education, Sep. 1985, vol. 62, No. 9, pp. 806.

International Search Report from Application No. PCT/KR2019/000890 dated Apr. 29, 2019, 2 pages.

Zhang, G. et al., "Determination of 15 kinds of Carbonyl Compounds in Carpet by High Performance Liquid Chromatography Coupled with 2,4-Dinitrophenylhydrazine (DNPH) Derivatization," Leather and Chemicals, Oct. 2016, pp. 12-16, vol. 33. No. 5. [Providing English Translation of Abstract only].

Liang, D. "Separation and Purification of Jasmonal by Column Chromatography" Chemistry Bulletin, No. 12, Dec. 1995, 2 pages.

Search Report dated Mar. 28, 2022 from the Office Action for Chinese Application No. 201980005322.6 dated Apr. 6, 2022, pp. 1-4.

\* cited by examiner

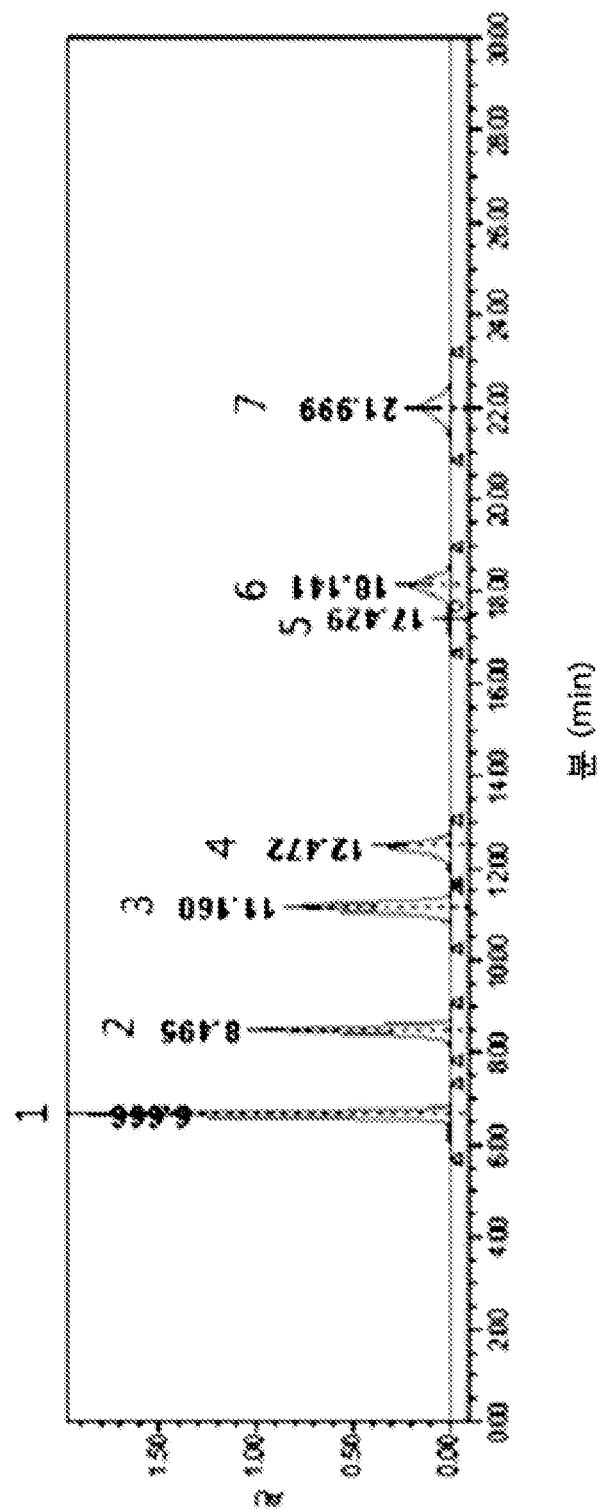
[Fig. 1] PRIOR ART

【Fig. 2】
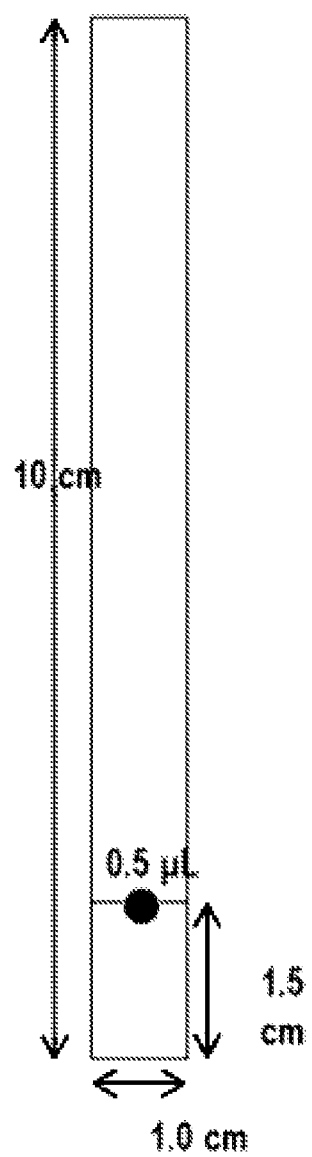

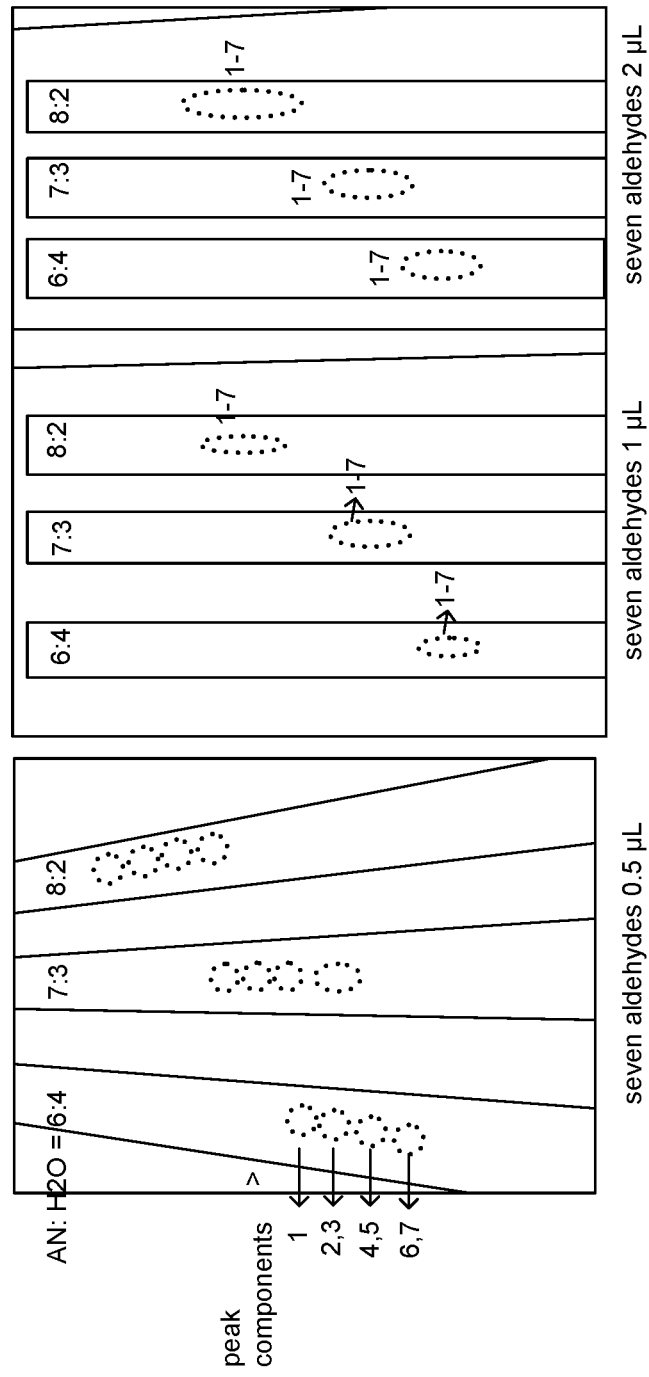
[Fig. 3]

【Fig. 4】
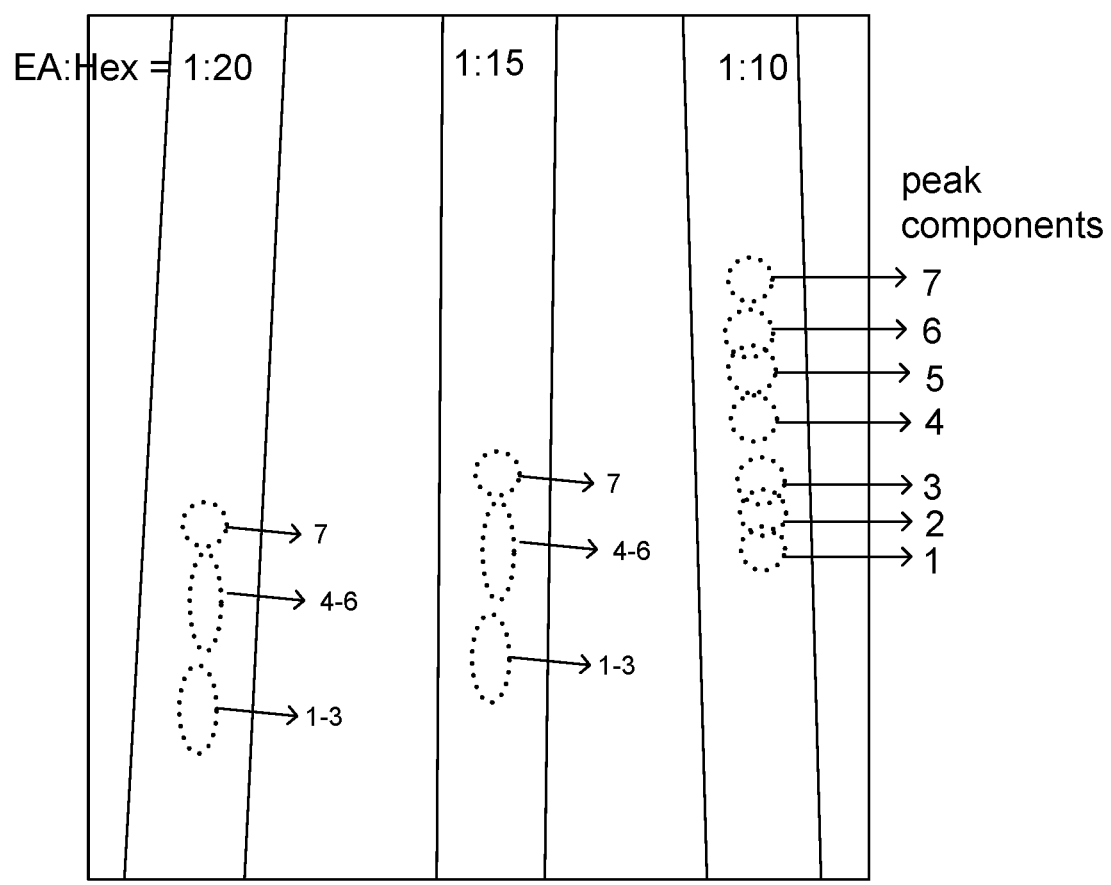

METHOD FOR DETECTING ALDEHYDE AND KETONE BY USING THIN LAYER CHROMATOGRAPHY

CROSS-REFERENCE TO RELATED APPLICATIONS

The present application is a national phase entry under 35 U.S.C. § 371 of International Application No. PCT/KR2019/000890, filed on Jan. 22, 2019, which claims priority from Korean Patent Application No. 10-2018-0066797, filed on Jun. 11, 2018, the entire disclosure of which are incorporated herein by reference.

BACKGROUND OF THE INVENTION

1. Field of the Invention

The present invention relates to a method for detecting aldehyde and/or ketone compounds using Thin Layer Chromatography (hereinafter abbreviated as "TLC"), and more particularly, to a method for simultaneously quantitatively and qualitatively analyzing aldehyde and/or ketone compounds in a shorten time by using optimal TLC analysis conditions.

2. Description of the Related Art

Carbonyl compounds such as aldehydes and ketones are important constituents of urban and global atmospheres, forming photochemical smog, promoting ozone formation reactions and generating odors. In particular, formaldehyde has been studied for its effect on the human body since it stimulates a mucous membrane of eyes, skin or respiratory tract and causes bronchial asthma or allergy even with short-term exposure and it is considered to be a carcinogenic substance as a result of animal experiments. Such carbonyl compounds are widely distributed indoors and outdoors, such as in automobile exhaust gas, insulation materials, tobacco smoke, and furniture, thus raising concerns about environmental pollution.

Precise but unobstructed techniques are required in order to measure a low level of carbonyl compounds, since carbonyl compounds do not have a chromophore and cannot be detected by UV detectors. Accordingly, a method has been developed in which a carbonyl compound, such as aldehydes and ketones, having a low molecular weight in air and water is derivatized to its hydrazine derivative (see, the scheme shown below) using 2,4-dinitrophenylhydrazine (hereinafter abbreviated as "2,4-DNPH"), thereby easily visualizing it to detect the derivative by High Performance Liquid Chromatography (hereinafter abbreviated as "HPLC").

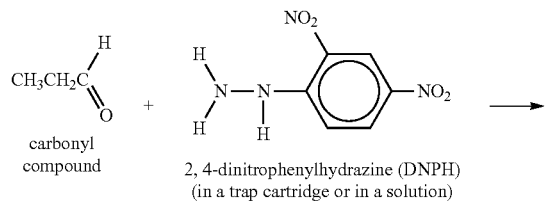

carbonyl compound + 2, 4-dinitrophenylhydrazine (DNPH) (in a trap cartridge or in a solution)

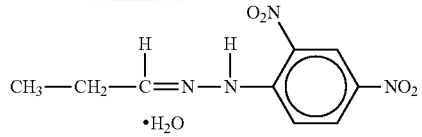

•$H_2O$ carbony-2, 4-dinitrophenyl hydrazine derivative (orange compound)

DNPH Derivatization Mechanism

Chromatography combined with such chemical derivatization is a representative method for the measurement of carbonyl compounds, and has an advantage of excellent sensitivity and selective detection. However, a HPLC method has no economic advantage because it proceeds with expensive HPLC equipment. Then, a method of using TLC was proposed as a more convenient method than a HPLC method. In one embodiment of this method, strong acids, such as sulfuric acid ($H_2SO_4$), hydrochloric acid (HCl) or dichloromethane ($CH_2Cl_2$), are used as sampling or developing solvents. However, strong acids are difficult to handle and dichloromethane has a risk of toxic chloride gas release when exposed to high temperatures. In addition, in another embodiment of the TLC method, the accuracy of analysis results fluctuated depending on the injection amount of the sample, the mixing ratio of the developing solvent, and the interaction between mobile phase, stationary phase and vapor phase of TLC. However, the TLC method has the advantage of allowing analysis by the interaction between mobile phase and stationary phase without using a harmful solvent.

Accordingly, there has been continued research on a convenient and accurate TLC analysis method for detecting aldehyde and/or ketone, while maintaining the advantages of the TLC method and not having the disadvantages which were a problem in the past. The inventors of the present invention have come to provide an optimal TLC assay for the detection of aldehyde and/or ketone.

SUMMARY OF THE INVENTION

The object of the present invention is not only to provide analytical results equivalent to those of conventional HPLC in a shorter time in the analysis of aldehyde and/or ketone, but also to provide qualitative and quantitative analysis of aldehyde and/or ketone which eliminate the need for harmful solvents, including strong acids and dichloromethane.

It is a further object of the present invention to provide qualitative and quantitative analysis of aldehyde and/or ketone using TLC, which allows for the use of smaller amounts of samples compared to the methods using conventional HPLC.

In order to solve the above problems, the present invention provides a method for simultaneously qualitatively and quantitatively analyzing aldehyde or ketone compounds in a shorten time by using an optimal TLC plate, TLC developing solvent ratio, sample amount, and the like.

More particularly, the present invention provides a method for qualitatively and quantitatively analyzing aldehyde and ketone, comprising the steps of:

(i) injecting a sample of aldehyde and/or ketone into a cartridge containing 2,4-dinitrophenylhydrazine (2,4-DNPH) to obtain a 2,4-dinitrophenylhydrazone derivative;

(ii) extracting the 2,4-dinitrophenylhydrazone derivative from the step (i) with a solvent; and (iii) analyzing the extract from the step (ii) by thin layer chromatography.

In one embodiment, the cartridge containing 2,4-DNPH in the step (i) is commonly used in the art, and may contain 2,4-DNPH coated silica.

In one embodiment, the extraction solvent in the step (ii) is commonly used in the art, and for example, may be acetonitrile (hereinafter abbreviated as "AN").

In one embodiment, the extract in the step (iii) can be used in TLC in small amounts, for example in an amount of 0.3 to 0.7 μL.

In one embodiment, the developing solvent of TLC in the step (iii) is a mixed solvent of ethyl acetate (hereinafter abbreviated as "EA") and hexane (hereinafter abbreviated as "Hex"), for example, may be a mixed solvent of EA:Hex=1:8 to 1:12.

Effect of the Invention

According to the analytical method of the present invention, an analysis result equivalent to that of a conventional HPLC can be obtained in a shorter time without using a harmful solvent in detection of aldehyde and/or ketone.

BRIEF DESCRIPTION OF THE DRAWINGS

FIG. 1 shows a HPLC chromatogram of a sample of 2,4-dinitrophenylhydrazone derivative of an aldehyde and/or ketone compound.

FIG. 2 shows a TLC plate used in one embodiment of the present invention.

FIG. 3 shows the results of separation on a TLC plate according to the amount of use of samples of aldehyde and/or ketone compound (0.5 μL, 1 μL and 2 μL).

FIG. 4 shows the results of separation of a sample of an aldehyde and/or ketone compound according to a type and a mixing ratio of the developing solvent (eluent) of TLC.

DETAILED DESCRIPTION OF THE INVENTION

Hereinafter, embodiments of the present invention will be described in more detail.

As the invention allows for various changes and numerous embodiments, particular embodiments will be illustrated in the drawings and described in detail in the written description. However, this is not intended to limit the present invention to the specific embodiments, and it should be understood to include all conversions, equivalents or alternatives included in the spirit and scope of the present invention. In the following description of the present invention, if it is determined that the detailed description of the related known technology may obscure the gist of the present invention, the detailed description thereof will be omitted.

In the present invention, it is intended to secure an inexpensive and rapid optimal method while maintaining the resolution of HPLC, compared to the method using 2,4-DNPH derivatization and HPLC, which is a typical method for measuring carbonyl compounds.

Accordingly, the present invention provides a qualitative and quantitative analysis method of carbonyl compounds using TLC. To this end, the challenge is to select an optimal TLC plate, an optimal ratio of developing solvent, and an optimal amount of a sample to be used, and to reduce the analysis time.

Qualitative and quantitative analysis of carbonyl compounds using TLC according to the present invention has the advantage that the results can be seen visually by 2,4-DNPH derivatization and multiple samples can be analyzed simultaneously under the same conditions.

In order to solve the above problems, the present invention provides a method for qualitatively and quantitatively analyzing aldehyde or ketone, comprising the steps of:

(i) injecting a sample of aldehyde and/or ketone into a cartridge containing 2,4-dinitrophenylhydrazine (2,4-DNPH) to obtain a 2,4-dinitrophenylhydrazone derivative;

(ii) extracting the 2,4-dinitrophenylhydrazone derivative from the step (i) with a solvent; and (iii) analyzing the extract from the step (ii) by TLC.

In one embodiment, the sample of aldehyde and/or ketone is obtained from air or water.

In one embodiment, the aldehyde and/or ketone comprises formaldehyde, acetaldehyde, acrolein, acetone, propionaldehyde, butyraldehyde, benzaldehyde, crotonaldehyde, iso-valeraldehyde, n-valeraldehyde, o-tolualdehyde, m-tolualdehyde, p-tolualdehyde, hexaldehyde, 2,5-dimethylbenzaldehyde, and the like.

In one embodiment, the 2,4-dinitrophenylhydrazone derivative comprises formaldehyde-2,4-dinitrophenylhydrazone, acetaldehyde-2,4-dinitrophenylhydrazone, acrolein-2,4-dinitrophenylhydrazone, acetone-2,4-dinitrophenylhydrazone, propionaldehyde-2,4-dinitrophenylhydrazone, butyraldehyde-2,4-dinitrophenylhydrazone, benzaldehyde-2,4-dinitrophenylhydrazone, crotonaldehyde-2,4-dinitrophenylhydrazone, methacrolein-2,4-dinitrophenylhydrazone, 2-butanone-2,4-dinitrophenylhydrazone, valeraldehyde-2,4-dinitrophenylhydrazone, m-tolualdehyde-2,4-dinitrophenylhydrazone, hexaldehyde-2,4-dinitrophenylhydrazone, and the like.

In one embodiment, the cartridge containing 2,4-DNPH may contain 2,4-DNPH coated silica or be immersed in an acidified 2,4-DNPH solution. If the sample of aldehyde and/or ketone is obtained from air, the sample may be injected into the 2,4-DNPH-containing cartridge for 5 minutes at a flow rate of 1 to 2 L/min. If the sample of aldehyde and/or ketone is obtained from water, 2,4-DNPH buffered at pH 3 may be added directly to the sample.

In one embodiment, the extraction solvent in the step (ii) may be acetonitrile (AN).

In one embodiment, the 2,4,-dinitrophenylhydrazone derivative extract in the step (iii) can be used in TLC in small amounts, for example in an amount of 0.3 to 0.7 μL. When the amount of the 2,4-dinitrophenylhydrazone derivative extract is out of the above range, the separation resolution on the TLC plate is low and the separation of the sample is hardly identified. In the present specification, the amount of the extract is considered to be the same as the sample amount or the sample injection amount.

In another embodiment, the 2,4-dinitrophenylhydrazone derivative extract in the step (iii) may be used in an amount of 0.4 to 0.6 μL, for example 0.5 μL.

In one embodiment, the developing solvent of TLC in the step (iii) is a mixed solvent of ethyl acetate (EA) and hexane (Hex) and may be used with EA:Hex=1:8 to 1:12. If the proportion of developing solvent of TLC is out of this range, the separation of the sample on a TLC plate is hardly identified.

In other embodiments, the developing solvent of TLC in the step (iii) may be used with EA:Hex=1:9 to 1:11, such as 1:10.

The conditions of use as mentioned above may be applied simultaneously to the separation of, in particular, seven aldehydes and/or ketones, i.e., formaldehyde, acetaldehyde, acrolein, acetone, propionaldehyde, butyraldehyde and benzaldehyde, among aldehydes and/or ketones as exemplified above. In the case of separating two or three aldehydes and/or ketones among other aldehydes and/or ketones including these, the above conditions may not be applied simultaneously.

In one embodiment, the TLC plate in the step (iii) is a RP-18 F254s TLC plate (silica gel coating, aluminum support) having a C18 coating thickness of 0.2 mm, a plate size of 10 cm×1 cm, with using up to 40% water. One example of the TLC plate that can be used in the present invention is shown in FIG. 2.

Hereinafter, embodiments of the present invention will be described in detail so that those skilled in the art can easily practice the present invention. However, the present invention can be implemented in various different ways and is not limited to the embodiments described herein.

1. Analysis with HPLC (Prior Art)

According to the prior art, a sample of aldehyde/ketone was analyzed using HPLC as follows.

(1) A commercial standard (3 μg/mL) in which aldehyde and ketone derivatized with 2,4-DNPH were dissolved in acetonitrile (AN) was used as a standard (Sigma, St. Louis, Mo.).

(2) A carbonyl-containing air sample was passed through a 2,4-DNPH containing cartridge for 5 minutes at a flow rate of 1.5 L/min to obtain a 2,4-dinitrophenylhydrazone derivative.

(3) The colored 2,4-dinitrophenylhydrazone derivative from (2) was extracted with acetonitrile (AN) for 1 minute so that the total volume of the extract was 5 mL.

(4) The extract from (3) was injected into an HPLC reversed-phase column and analyzed by fixing the wavelength of the UV detector at 360 nm using HPLC. HPLC analysis conditions were as follows:

HPLC system: Waters Aliance 2695
PDA detector (photodiode array detector): Waters 2996
Software: Waters Empower 3 (Build 3471)
Column: Capcell Pak C18 (4.6 mm ID×250 mm L, 5 μm)
Detection wavelength: 241 nm
Flow rate: 1.0 mL/min
Column temperature: 40° C.
Sample injection volume: 10 μL
Extraction solvent (eluent): mobile phase A—acetonitrile (AN, for HPLC, J. T. Baker); mobile phase B—ultrapure water (filtered by solvent clarification system). Isocratic elution behavior was investigated until 30 minutes at 50% of mobile phase A.

(5) Seven 2,4-dinitrophenylhydrazone derivatives were identified from the HPLC chromatogram obtained in (4) (see FIG. 1). The concentrations of the measured 2,4-dinitrophenylhydrazone derivatives are as listed in Table 1 below:

TABLE 1

| Peak # | Sample | Conc. (μg/mL) |
|---|---|---|
| 1 | Formaldehyde-2,4-dinitrophenylhydrazone | 1500 |
| 2 | Acetaldehyde-2,4-dinitrophenylhydrazone | 1000 |
| 3 | Acrolein-2,4-dinitrophenylhydrazone | 500 |

TABLE 1-continued

| Peak # | Sample | Conc. (μg/mL) |
|---|---|---|
| 4 | Acetone-2,4-dinitrophenylhydrazone | 500 |
| 5 | Propionaldehyde-2,4-dinitrophenylhydrazone | 500 |
| 6 | Butyraldehyde-2,4-dinitrophenylhydrazone | 500 |
| 7 | Benzaldehyde-2,4-dinitrophenylhydrazone | 500 |

The separation of the seven 2,4-dinitrophenylhydrazone derivatives took 30 minutes.

Example 1

In this example, the results of TLC analysis with the sample injection amount of 0.5 μL are described.

(1) A carbonyl-containing air sample was passed through a 2,4-DNPH containing cartridge for 5 minutes at a flow rate of 1.5 L/min to obtain a 2,4-dinitrophenylhydrazone derivative.

(2) The colored 2,4-dinitrophenylhydrazone derivative from (1) was extracted with acetonitrile (AN) for 1 minute so that the total volume of the extract was 5 mL.

(3) The extract from (2) was placed on a RP-18 F254s TLC plate (silica gel coating, aluminum support) (C18 coating thickness 0.2 mm, plate size 10 cm×1 cm) and developed with a mixed solution of AN:$H_2O$=6:4, 7:3 and 8:2, respectively. The TLC separation results are shown in FIG. 3 (see "seven aldehydes 0.5 μL" on the left in FIG. 3).

As can be seen in FIG. 3, seven 2,4-dinitrophenylhydrazone derivatives of aldehyde and ketone are separated into four spots (indicated by the "peak components" on the left in FIG. 3) and detected in the order shown on the left, that is, 1→2, 3→4, 5→6, 7 (1: Formaldehyde-2,4-dinitrophenylhydrazone, 2: Acetaldehyde-2,4-dinitrophenylhydrazone, 3: Acrolein-2,4-dinitrophenylhydrazone, 4: Acetone-2,4-dinitrophenylhydrazone, 5: Propionaldehyde-2,4-dinitrophenylhydrazone, 6: Butyraldehyde-2,4-dinitrophenylhydrazone, 7: Benzaldehyde-2,4-dinitrophenylhydrazone).

The separation of seven 2,4-dinitrophenylhydrazone derivatives of aldehyde and ketone took 5 minutes.

Comparative Example 1.1

The same procedure as in Example 1 was carried out except that the sample injection amount was changed to 1 μL. The TLC separation results are shown in FIG. 3 (see "seven aldehydes 0.5 μL" in the middle in FIG. 3).

As can be seen in FIG. 3, seven 2,4-dinitrophenylhydrazone derivatives of aldehyde and ketone were not separately isolated.

Comparative Example 1.2

The same procedure as in Example 1 was carried out except that the sample injection amount was changed to 2 μL. The TLC separation results are shown in FIG. 3 (see "seven aldehydes 2 μL" on the right in FIG. 3).

As can be seen in FIG. 3, seven 2,4-dinitrophenylhydrazone derivatives of aldehyde and ketone were not separately isolated.

From the above Example 1 and Comparative Examples 1.1 and 1.2, it can be seen that the resolution of TLC in the case of the sample injection amount of 0.5 μL is higher than in the case of 1 μL and 2 μL, under the condition of the same developing solvent.

Example 2

This example presents the TLC analysis results using a mixed solvent of ethyl acetate (EA):hexane (Hex)=1:10 as the TLC developing solvent while fixing the sample injection amount at 0.5 μL.

The same procedure as in Example 1 was carried out except that a mixed solvent of ethyl acetate (EA):hexane (Hex)=1:10 was used in place of a mixed solution of AN:$H_2O$=6:4, 7:3 and 8:2 in Example 1 (3). The TLC separation results are shown in FIG. 4 (see "1:10" on the right in FIG. 4).

As can be seen in FIG. 4, seven 2,4-dinitrophenylhydrazone derivatives of aldehyde and of ketone were separated into their respective components (indicated by "peak components 1-7" on the right in FIG. 4; 7→6→5→4→3→2→1). The concentrations of the isolated derivatives are shown in Table 2 below:

TABLE 2

| Peak # | Sample | Conc. (μg/mL) |
|---|---|---|
| 1 | Acetaldehyde-2,4-dinitrophenylhydrazone | 1000 |
| 2 | Acetone-2,4-dinitrophenylhydrazone | 500 |
| 3 | Acrolein-2,4-dinitrophenylhydrazone | 500 |
| 4 | Benzaldehyde-2,4-dinitrophenylhydrazone | 500 |
| 5 | Butyraldehyde-2,4-dinitrophenylhydrazone | 500 |
| 6 | Formaldehyde-2,4-dinitrophenylhydrazone | 1500 |
| 7 | Propionaldehyde-2,4-dinitrophenylhydrazone | 500 |

The separation of seven 2,4-dinitrophenylhydrazone derivatives of aldehyde and ketone took 5 minutes. Therefore, the time taken for obtaining the analysis results equivalent to those of the conventional HPLC method using TLC was shortened.

Comparative Example 2.1

The same procedure as in Example 2 was carried out except that the mixing ratio of EA:Hex was changed to 1:15. The TLC separation results are shown in FIG. 4 (see "1:15' in the middle in FIG. 4).

As can be seen in FIG. 4, seven 2,4-DNPH derivatives of aldehyde and ketone were separated into three spots (7→4, 5,6→1,2,3) and not isolated separately.

Comparative 2.2

The same procedure as in Example 2 was carried out except that the mixing ratio of EA:Hex was changed to 1:20. The TLC separation results are shown in FIG. 4 (see "1:20" on the left in FIG. 4).

As can be seen in FIG. 4, seven 2,4-DNPH derivatives of aldehyde and ketone were separated into three spots (7→4, 5,6→1,2,3) and not isolated separately.

From the above Example 2 and Comparative Examples 2.1 and 2.2, it was confirmed that all seven samples were separated in the case that EA:Hex=1:10 is used as a developing solvent under the same injection amount.

As described above, it can be seen that, according to the present invention, the clear separation of each component is possible and the analysis time is shortened compared to HPLC method, by providing the optimum mixing ratio of the developing solvent and the injection amount of the sample in the detection of aldehyde and/or ketone by TLC.

It will be understood by those skilled in the art that various changes in form and details may be made therein without departing from the spirit or essential characteristics of the invention. Therefore, it should be understood that the above-described embodiments are illustrative in all aspects and not restrictive. Thus, the substantial scope of the present invention will be defined by the appended claims and their equivalents.

What is claimed is:

1. A method for analyzing aldehyde or ketone, comprising:
   (i) injecting a sample of the aldehyde or the ketone into a cartridge containing 2,4-dinitrophenylhydrazine (2,4-DNPH) to obtain a 2,4-dinitrophenylhydrazone derivative;
   (ii) extracting the 2,4-dinitrophenylhydrazone derivative obtained during the injecting with a solvent to produce an extract; and
   (iii) analyzing the extract by thin layer chromatography (TLC) to identify aldehyde or ketone derivatives corresponding to the aldehyde or the ketone of the sample,
   wherein the sample of the aldehyde or the ketone is injected in an amount of 0.3 to 0.7 μL, and
   wherein the analyzing the extract by TLC is performed using a developing solvent which is a mixed solvent of ethyl acetate (EA) and hexane (Hex) of 1:8 to 1:12.

2. The method for analyzing aldehyde or ketone according to claim 1, wherein the sample of aldehyde or ketone comprises at least one selected from of formaldehyde, acetaldehyde, acrolein, acetone, propionaldehyde, butyraldehyde, benzaldehyde, crotonaldehyde, iso-valeraldehyde, n-valeraldehyde, o-tolualdehyde, m-tolualdehyde, p-tolualdehyde, hexaldehyde and 2,5-dimethylbenzaldehyde.

3. The method for analyzing aldehyde or ketone according to claim 1, wherein the solvent is acetonitrile (AN).

4. The method for analyzing aldehyde or ketone according to claim 1, wherein the 2,4-dinitrophenylhydrazone derivative is at least one selected from the group consisting of formaldehyde-2,4-dinitrophenylhydrazone, acetaldehyde-2,4-dinitrophenylhydrazone, acrolein-2,4-dinitrophenylhydrazone, acetone-2,4-dinitrophenylhydrazone, propionaldehyde-2,4-dinitrophenylhydrazone, butyraldehyde-2,4-dinitrophenylhydrazone, benzaldehyde-2,4-dinitrophenylhydrazone, crotonaldehyde-2,4-dinitrophenylhydrazone, methacrolein-2,4-dinitrophenylhydrazone, 2-butanone-2,4-dinitrophenylhydrazone, valeraldehyde-2,4-dinitrophenylhydrazone, m-tolualdehyde-2,4-dinitrophenylhydrazone and hexaldehyde-2,4-dinitrophenylhydrazone.

* * * * *